(12) United States Patent
Potter et al.

(10) Patent No.: US 6,757,768 B1
(45) Date of Patent: Jun. 29, 2004

(54) APPARATUS AND TECHNIQUE FOR MAINTAINING ORDER AMONG REQUESTS ISSUED OVER AN EXTERNAL BUS OF AN INTERMEDIATE NETWORK NODE

(75) Inventors: Kenneth H. Potter, Raleigh, NC (US); Trevor Garner, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 447 days.

(21) Appl. No.: 09/859,707

(22) Filed: May 17, 2001

(51) Int. Cl.[7] .............................................. G06F 13/00
(52) U.S. Cl. ...................................................... 710/112
(58) Field of Search ..................... 710/1, 5, 6, 305–314, 710/100, 112, 36, 39, 52; 709/200; 370/412–414

(56) References Cited

U.S. PATENT DOCUMENTS

| | | | | |
|---|---|---|---|---|
| 4,805,098 A | * | 2/1989 | Mills et al. ................... | 711/118 |
| 5,455,907 A | * | 10/1995 | Hess et al. ................... | 710/240 |
| 5,522,080 A | * | 5/1996 | Harney ........................ | 710/241 |
| 5,745,732 A | * | 4/1998 | Cherukuri et al. .......... | 710/310 |
| 5,764,930 A | * | 6/1998 | Staats ........................... | 710/107 |
| 5,870,567 A | * | 2/1999 | Hausauer et al. ........... | 710/310 |
| 5,870,625 A | * | 2/1999 | Chan et al. .................. | 710/5 |
| 6,016,526 A | * | 1/2000 | Arimilli et al. ............. | 710/105 |
| 6,122,283 A | * | 9/2000 | Lee .............................. | 370/408 |
| 6,148,359 A | * | 11/2000 | Elkhoury et al. ........... | 710/311 |
| 6,209,067 B1 | * | 3/2001 | Collins et al. .............. | 710/240 |
| 6,240,508 B1 | * | 5/2001 | Brown et al. ................ | 710/39 |
| 6,330,645 B1 | | 12/2001 | Harriman | |
| RE37,980 E | * | 2/2003 | Elkhoury et al. ........... | 710/310 |

OTHER PUBLICATIONS

U.S. patent application Ser. No. 09/859,709, Potter et al., filed May 17, 2001.

* cited by examiner

Primary Examiner—Xuan M. Thai
(74) Attorney, Agent, or Firm—Cesari and McKenna, LLP

(57) ABSTRACT

An apparatus and technique off-loads responsibility for maintaining order among requests issued over a split transaction bus from a processor to a split transaction bus controller, thereby increasing the performance of the processor. A logic circuit enables the controller to defer issuing a subsequent (write) request directed to an address on the bus until all pending (read) requests complete. By off-loading responsibility for maintaining order among requests from the processor to the controller, the invention enhances performance of the processor since the processor may proceed with program execution without having to stall to ensure such ordering. The logic circuit maintains the order of the requests in an efficient manner that is transparent to the processor.

51 Claims, 5 Drawing Sheets

APPARATUS AND TECHNIQUE FOR MAINTAINING ORDER AMONG REQUESTS ISSUED OVER AN EXTERNAL BUS OF AN INTERMEDIATE NETWORK NODE

CROSS-REFERENCE TO RELATED APPLICATIONS

The present invention is related to the following co-pending and commonly assigned U.S. patent application Ser. No. 09/859,709 titled, Apparatus and Technique for Maintaining Order Among Requests Directed to a Same Address on an External Bus of an Intermediate Network Node, which was filed on even date herewith and which application is hereby incorporated by reference as though fully set forth herein.

FIELD OF THE INVENTION

This invention relates generally to intermediate nodes of computer networks and, more specifically, to maintaining order among requests issued over an external bus of an intermediate node of a computer network.

BACKGROUND OF THE INVENTION

A computer network is a geographically distributed collection of interconnected subnetworks for transporting data between nodes, such as computers. A local area network (LAN) is an example of such a subnetwork; a plurality of LANs may be further interconnected by an intermediate network node, such as a router or switch, to extend the effective "size" of the computer network and increase the number of communicating nodes. The nodes typically communicate by exchanging discrete frames or packets of data according to predefined protocols. In this context, a protocol consists of a set of rules defining how the nodes interact with each other.

Each node typically comprises a number of basic systems including a processor, a main memory and an input/output (I/O) system. Data is transferred between the main memory, processor and I/O system over a system bus, while data transactions within the I/O system occur over an external bus, such as an I/O bus. Each bus typically consists of either address, data and control lines, with the control lines carrying control signals specifying the direction and type of transfer, or a pair of unidirectional signals for passing bus packets containing address, data and control such as in the case of HyperTransport (HPT) bus. For example, the processor (i.e., a source) may issue a read transaction to request the transfer of data from an addressed location on an I/O device (i.e., a target) coupled to the I/O bus and over the system bus to the processor. The processor then processes the retrieved data in accordance with instructions that may have been obtained from main memory. The processor may thereafter issue a write transaction requesting that the results be stored in, e.g., an addressed location in the main memory.

Some buses operate in an "atomic" manner such that the source is granted exclusive access (i.e., control) to the bus until the transaction is complete. However, an atomic bus may potentially waste bus cycles, particularly when waiting for data in response to, e.g., a read request. In a split transaction bus, on the other hand, the source relinquishes control over the bus once the request is sent and an independent response to the request is subsequently returned to the source. Here, the target acquires control of the bus to return the response to the source. The split transaction bus thus essentially enables a transaction to be divided into at least two transfers: the request and the response.

Devices coupled to the split transaction bus typically include common sets of resources (such as buffers or queues) used to store request and response transfers sent over the bus. It is possible that some of the resources may be consumed by these transfers, thereby causing a deadlock situation on the bus. To obviate such a situation, transactions sent over the bus may be reordered. However, re-ordering of transactions over a split transaction bus may result in inconsistent data accesses that, in turn, may adversely impact performance of the system and node.

For example, a transaction re-ordering situation that may result in inconsistent data accesses is a read transaction that requests "pre-fetching" of the contents of a block of address locations. If a write transaction is allowed to "pass" the read request, then the actual read access will retrieve data having a value indicative of the results of the write request. Another situation where it is necessary to maintain the order of read requests to avoid inconsistent data accesses involves requests directed to a similar address, e.g., the "head" of a first-in, first-out (FIFO) queue. The data "word" present at the head of the FIFO changes between an initial read request and a subsequent read request Accordingly, if those requests are allowed to get "out of order", the result of the initial read request would be a subsequent data word rather than the intended initial data word.

In the case of a split transaction bus, such as the conventional peripheral computer interconnect bus or HyperTransport (HPT) bus, it is possible for transactions to be reordered due to the use of virtual channels and ordering rules defined for the bus. In particular, it is possible for a read request followed by a write request to the same address to appear "out of order" at their destination. For example, assume a target on the HPT bus includes a control status register (CSR) that contains status information for use by a source on the bus. Assume also that the source stores (via a write request) a particular value in the CSR and then subsequently retrieves (via a read request) the content of that CSR location to determine if it is appropriate to issue another transaction. An example of a typical instruction code sequence for this application is:

Write MACREG1 <value>
Read MACREG1
If(bit 3=j) then . . .
Write MACREG1 <new value>

The first write instruction is directed to writing a register (MACREG1) with a particular value. The next instruction is directed to reading the value of that register to check status; e.g., if (bit 3=j) then, etc. Thereafter, a subsequent write instruction is executed to write a new value to the MACREG1 register. Because of the ordering rules on the HPT bus, it is indeterminate as to which operation will occur first. Specifically, the HPT ordering rules allow write requests (e.g., posted requests) to "pass" any other request (e.g., non-posted requests) thereby allowing the transactions to be reordered at a device (such as a repeater) on the HPT bus to avoid deadlock. Thus, it is possible for the subsequent write request to pass the pending read request. Clearly, this may be problematic.

A typical solution to this problem is to require completion of the read request before the write request is issued. That is, to ensure ordering between transactions that may be reordered, software (such as a HPT device driver executing on a processor) is configured to defer ("hold off") issuing the subsequent write request until the pending read request completes. However, this approach is inefficient and degrades performance of the system since the processor is likely to stall program execution until the read request completes. The present invention is directed to a technique that ensures ordering of transactions without adversely impacting system performance.

SUMMARY OF THE INVENTION

The present invention relates to an apparatus and technique for off-loading responsibility for maintaining order among requests issued over a split transaction bus from a processor to a split transaction bus controller of an intermediate network node or any general purpose processor subsystem, thereby increasing the performance of the processor. To that end, the present invention comprises an ordering circuit that enables the controller to defer issuing a subsequent (write) request directed to an address on the bus until all pending (read) requests complete. By off-loading responsibility for maintaining order among requests from the processor to the controller, the invention enhances performance of the processor since the processor may proceed with program execution without having to stall to ensure such ordering. The ordering circuit maintains the order of the requests in an efficient manner that is transparent to the processor.

Specifically, the ordering circuit checks each write request that is issued by the processor to the split transaction bus to determine if there is an outstanding read request directed to the same address currently in progress (i.e., outstanding) over that bus. The circuit includes a data structure (i.e., table) configured to track outstanding requests issued over the split transaction bus. If it is determined that the write request is directed to an address of any outstanding read request, a conflict detection circuit asserts a conflict bit. The write request and the conflict bit are loaded into a first-in first-out (FIFO) buffer adapted to store commands to be transmitted over the split transaction bus.

The ordering circuit further includes a register having a plurality of bits, wherein each bit corresponds to a pending read request sent over the split transaction bus. According to the invention, assertion of a bit of the register and the conflict bit causes the write request to wait until all pending read requests complete before being sent over the split transaction bus. If additional read requests are issued to the same address, they must wait until the write request has been sent to the bus before they can be sent. In this case, the additional read requests may be loaded into the same FIFO as the write request.

In a situation involving read requests to different addresses, the requests can be sent over the split transaction bus before the write request, but the write request must wait for all pending read requests to complete before it is allowed to be sent. This condition is restrictive in the sense that write requests may wait an extended amount of time before being sent over the split transaction bus, which is illustratively an external input/output (I/O) bus. Thus, the present invention ensures proper ordering over an external split transaction I/O bus, such as the conventional peripheral computer interconnect bus or the HPT bus.

Advantageously, the novel ordering circuit provides a hardware solution that off-loads the requirement of a processor to maintain order among potentially conflicting requests issued to I/O devices coupled to an external I/O bus. For example, the processor may issue a pre-fetch read request to an address and forward that request to an I/O controller. The processor may then issue a write request to that address and not have to endure any latency (i.e., the processor may continue processing other information) since the controller assumes responsibility for ordering of those requests. The inventive circuit also reduces the complexity needed by the controller to ensure ordering of transactions, while facilitating increased performance over the bus.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
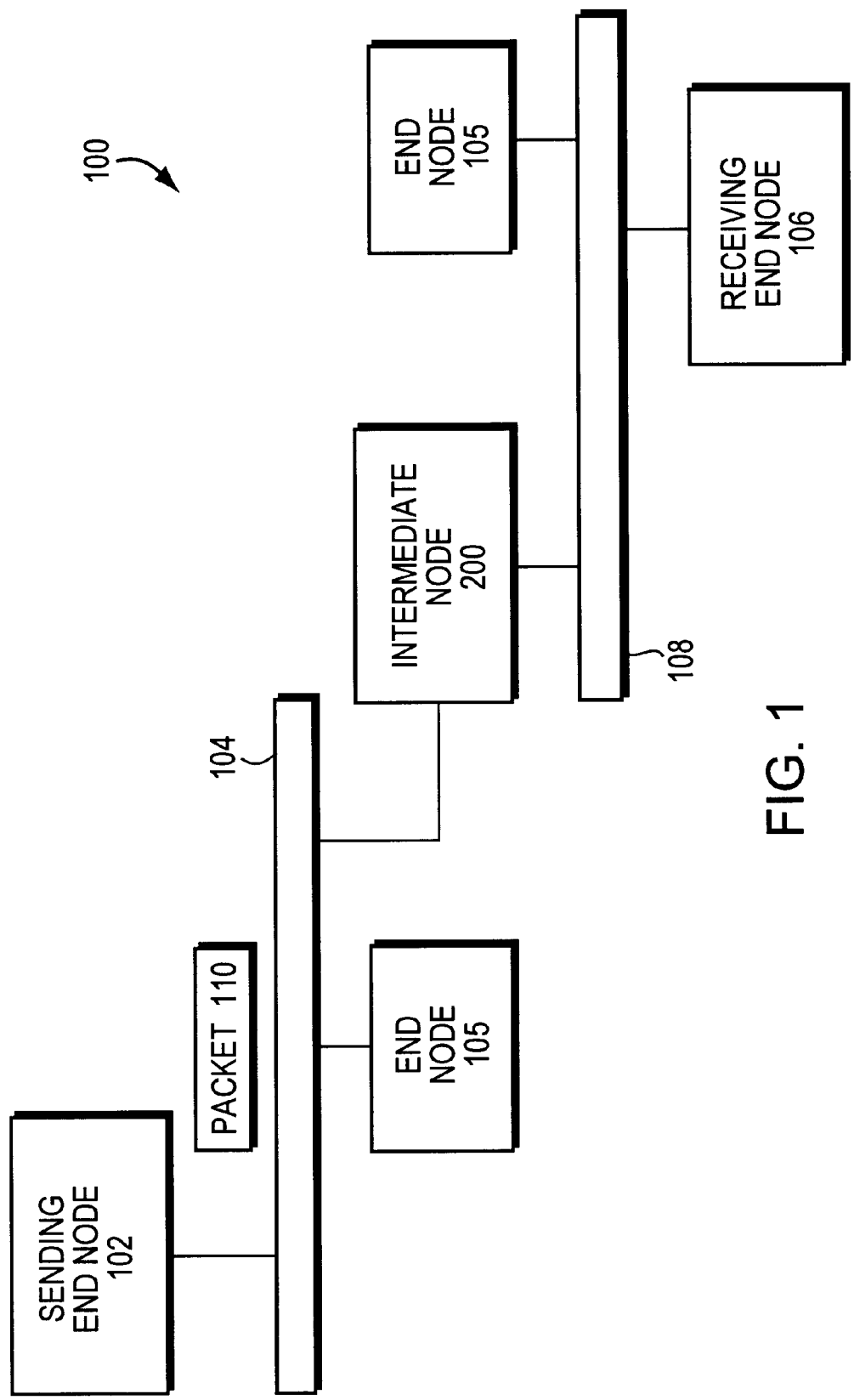
FIG. 1 is a block diagram of a computer network comprising a collection of interconnected subnetworks and nodes, including an intermediate network node.

FIG. 1 is a block diagram of a computer network 100 comprising a collection of interconnected subnetworks and nodes. The nodes may comprise computers including end nodes 105, such as a sending end node 102 and a receiving end node 106, and an intermediate network node 200, the latter of which may be a switch or router. The subnetworks 104, 108 included within network 100 are preferably local area networks (LANs) interconnected by the intermediate node 200, although the networks may comprise other communication links, such as wide area networks. Communication among the nodes coupled to the LANs is typically effected by exchanging discrete packets 110 among the nodes.

For example, the sending node 102 generates a data packet 110 by encapsulating "payload" data within headers, such as conventional data link and network layer headers, as the data passes through different layers of a protocol stack. The packet is then transmitted over the network to the intermediate node 200 which facilitates the flow of the data packet through the network by routing it to the proper receiving node 106. Specifically, the node 200 receives the packet from an input port, parses the data link and network layer headers, renders a forwarding decision for the packet, appends a new data link header to the packet and then transmits the packet to an output port.

Figure 2:
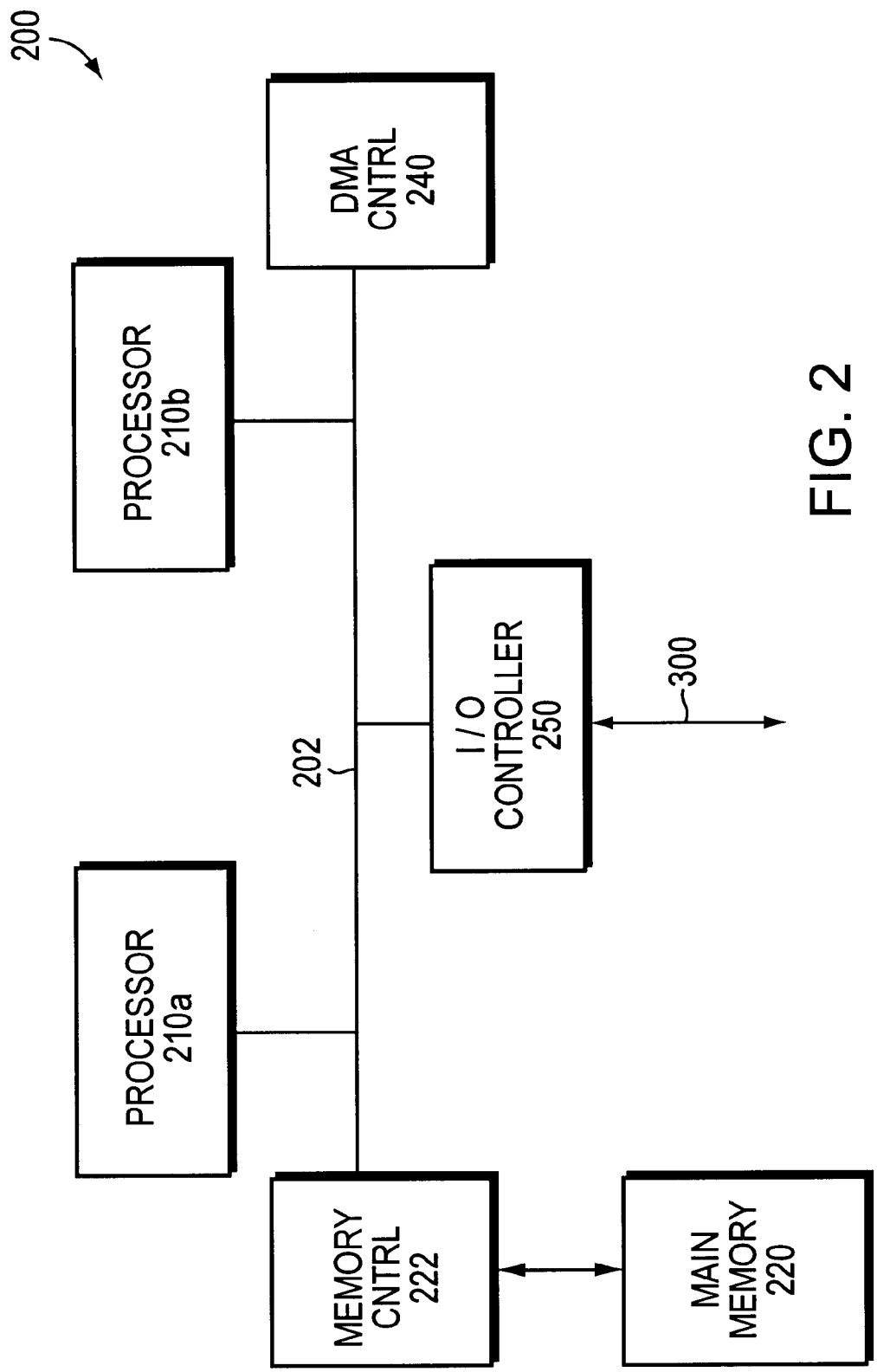
FIG. 2 is a schematic block diagram of an illustrative intermediate network node that may be advantageously used with the present invention.

FIG. 2 is a schematic block diagram of an illustrative intermediate network node 200 embodied as a dual-processor integrated circuit ("chip") with conventional external functions integrated within the chip. The dual-processor chip preferably includes two (2) processors 210a,b (e.g., MIPS processor cores) coupled to an input/output (I/O) bus controller 250 via a system bus 202. A memory controller 222 couples a main memory array 220, e.g., a synchronous dynamic random access memory (SDRAM) array, to the system bus 202. The main memory 220 comprises storage locations addressable by the processors for storing software programs and data structures associated with the invention described herein. An operating system, portions of which are typically resident in memory and executed by the processors, functionally organizes the intermediate node by, inter alia, invoking network operations in support of software processes executing on the node. It will be apparent to those skilled in the art that other memory means, including various computer readable media, may be used for storing and executing program instructions pertaining to the described mechanism and technique.

A direct memory access (DMA) controller 240 performs DMA operations between the main memory 220 and the I/O controller 250. The I/O controller 250 is an integral part of an I/O system containing input and output ports through which the intermediate node physically connects to the LAN or other interconnections, such as an external I/O bus 300. The I/O bus, in turn, may be coupled to external I/O devices, such as bridges, repeaters or peripheral devices (e.g., a system disk). The external I/O bus 300 may comprise a conventional peripheral computer interconnect (PCI) bus coupled to PCI devices or a conventional HyperTransport (HPT) bus coupled to HPT devices. The present invention illustratively relates to the ordering of read and write transactions over an external I/O bus 300, such as the HPT bus, but may also apply to the ordering of transactions over the PCI bus or any other similar split-transaction bus that supports the ordering rules described herein. In particular, the ordering circuit described herein resides within the I/O controller 250, such as an HPT bus controller.

Figure 3:
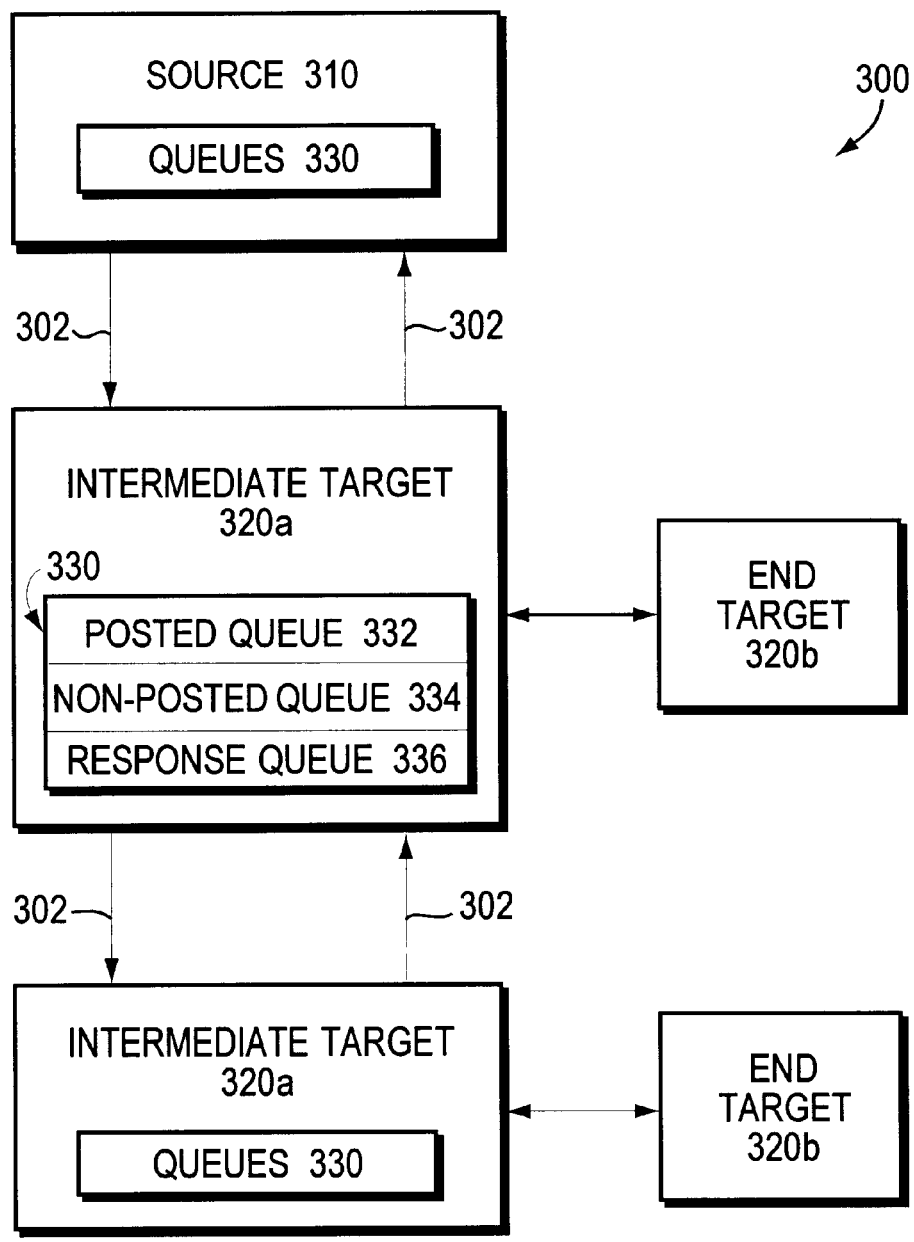
FIG. 3 is a schematic block diagram depicting the topology of a conventional external input/output (I/O) bus that may be advantageously used with the present invention.

FIG. 3 is a schematic block diagram depicting the topology of a conventional I/O bus 300, such as the HPT bus, including a source device 310 (e.g., the processor or HPT controller) connected to a plurality of intermediate target devices 320a (e.g., an HPT repeater) and end target devices 320b (e.g., an I/O device). The source 310 and targets 320 are interconnected via a plurality of unidirectional links 302 that cooperate to provide a high-speed transport.

Assume the source 310 issues a request for data, such as a read request, over the bus 300 to a target 320 coupled to that bus. Assume also that a period of time is necessary for the target to acquire the data requested by the source. Since the HPT bus is a split transaction bus, the source 310 relinquishes control over the bus once the request is sent. During the time the target 320 is processing the request, the source 310 may continue to issue other requests before it receives a response to the initial request. Upon acquiring the data requested in the initial request, the target 320 responds with a response packet that includes the data. The source essentially has ownership of the HPT bus transaction when issuing the request packet, while the target assumes ownership of the transaction when issuing the response packet to that request. Since the request is de-coupled in time from the response and the responses may arrive out of order, a transaction identifier is used with the HPT transaction to correlate the response with the request.

Each of the intermediate targets 320a (and source 310) includes buffers for storing transactions as they are received from the links 302. The buffers enable the devices to function as "store and forward" devices and, to that extent, provide opportunities for read/write requests to become out of order. For example, the HPT bus typically defines three buffers or first-in first-out (FIFO) queues 330 for storing various requests and response packets. A first FIFO queue 332 is designated for storing posted requests, i.e., requests for which there are typically no responses. An example of a posted request is a write request. A second FIFO queue 334 is a non-posted request queue used to store requests that require responses. Examples of a non-posted request are read requests, which typically require responses, and some write requests that may require responses. The present invention is primarily directed to write requests that are posted requests and read requests that are non-posted requests. A third FIFO queue 336 supported by the HPT bus specification is a response queue configured to store responses to the non-posted requests.

Each FIFO queue 330 is provided for each direction (i.e., for each unidirectional, point-to-point link) on the HPT bus. Furthermore, each queue may be defined as a virtual channel of the HPT specification. A set of rules governs the ordering of transactions (requests/responses) within the virtual channel queues in order to avoid deadlock over the HPT bus. These ordering rules are based on the availability of resources (posted, non-posted and/or response queues) within the HPT bus environment. As described herein, the HPT bus typically utilizes a credit-based flow control mechanism to provide "back pressure", on a "hop-by-hop" basis, in response to full utilization of resources within the devices.

Figure 4:
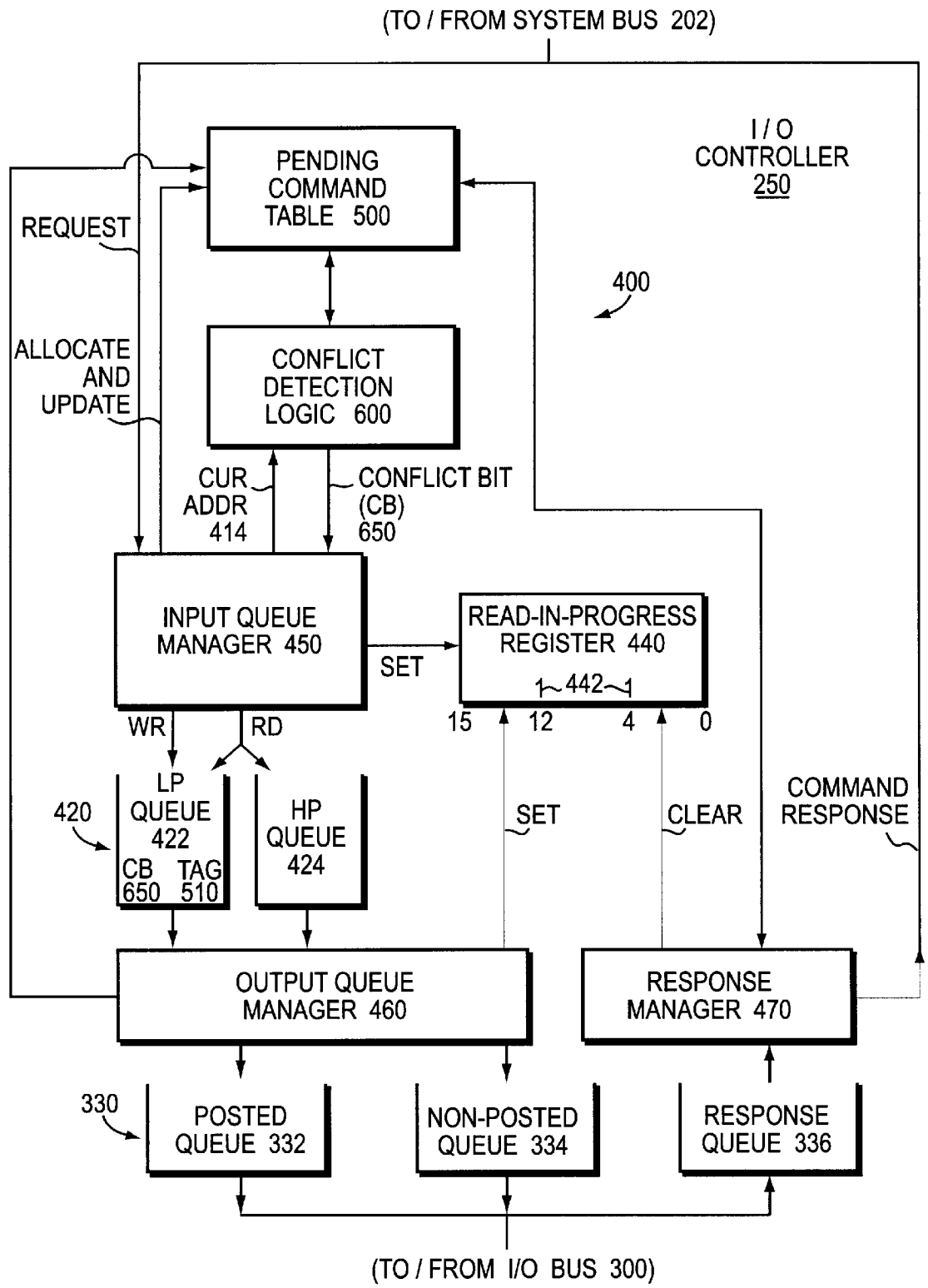
FIG. 4 is a schematic block diagram of a circuit embodied within a controller, such as an I/O controller, to ensure ordering of transactions over the I/O bus of FIG. 3.

FIG. 4 is a schematic block diagram of the ordering circuit 400 embodied within an I/O controller 250, such as the HPT bus controller, to ensure ordering of transactions over an external I/O bus 300, such as the HPT bus. The I/O controller 250 maintains a data structure that keeps track of the state of outstanding requests issued by the sources, such as processor 210 or DMA controller 240. The data structure is preferably a state table, which is hereinafter referred to as a pending command table 500.

Figure 5:
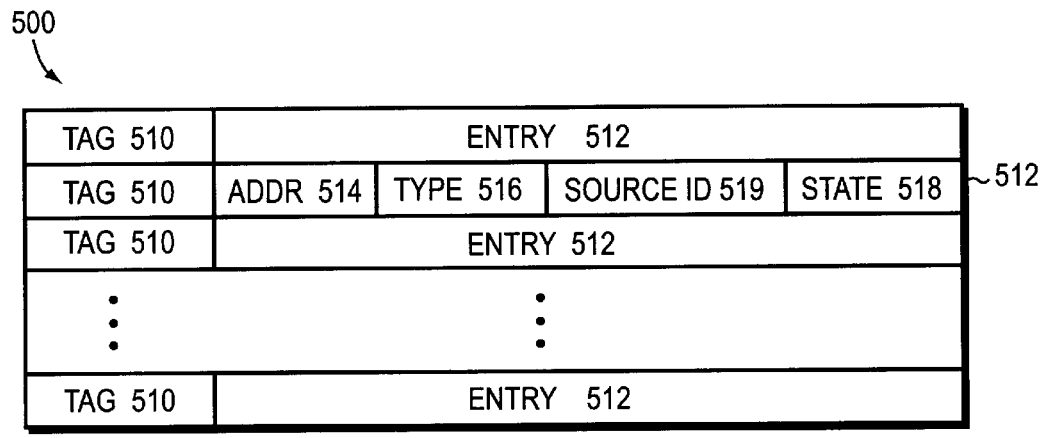
FIG. 5 is a schematic block diagram of a pending command table that may be advantageously used with the present invention.

FIG. 5 is a schematic block diagram of the pending command table 500 comprising a number of entries 512, each entry adapted to track a pending request issued by the processor 210 or DMA controller 240 and destined for the I/O bus 300. Each entry further includes a plurality of fields containing information pertaining to the pending (outstanding) request.

For example, each entry 512 includes an address field 514 for storing a target (destination) address of the request, a type field 516 for storing a particular type (read or write) of the request, a source ID field 519 for storing the identity of the source of the request and a state field 518 for storing a state (pending or non-pending) of the outstanding request. Associated with each entry 512 is a transaction identifier or a tag 510, such as an address or number of the entry in the table. In the illustrative embodiment, the tag 510 comprises four (4) bits for a total of sixteen (16) entries 512 in the table 500, although other embodiments, such as a 5-bit tag for a total of 32 table entries, may be used with the present invention.

The tag 510 associated with an outstanding request of a particular entry is included within a request packet transmitted over the I/O bus 300. The response to the request packet (i.e., the response packet) also includes the tag for purposes of correlating the response data to the request. Similarly, a write packet issued by the source includes a tag of an entry within the pending command table associated with that request. Write data destined for storage at a specified address location typically follows the write packet. The write packet generally requires no response; however, in the event a response is required, the tag 510 associated with the write packet is contained in the response to correlate it to the original write request.

Specifically, a source, such as processor 210, issues read/write transactions (requests) over the system bus 202 to the I/O controller 250, where the requests are loaded into the pending command table 500. An available entry 512 of the table is allocated to that request upon reception of the request at the controller 250. The information associated with the request is stored in the allocated entry 512. At that time, the state 518 (status) of the request is denoted pending in the entry 512 and the request is queued to be forwarded over the I/O bus 300 to the destination address.

When the result of that request (e.g., the response) is returned to the controller, it is eventually received by the Response Manager 470. The Response Manager 470 uses the tag in the response to locate the entry 512 in the pending command table corresponding to that response. Using the source ID field 519 of the entry 512 the Response Manager 470 identifies the source of the original request and forwards the data that was returned with the response to that source. The response manager then changes the state of the entry 512 from pending to non-pending.

The I/O controller 250 also includes one or more priority buffers 420 organized as first-in, first-out (FIFO) queues used to store the read/write request packets destined for the I/O bus 300. In the illustrative embodiment, there are preferably two priority FIFO queues 420: a low priority (LP) FIFO queue 422 and a high priority (HP) FIFO queue 424. The use of two priority queues 420 enables the controller 250 to support out-of-order processing of transactions in accordance with an I/O (e.g., HPT) bus protocol. As noted, out-of-order processing is employed to avoid deadlock conditions on the I/O bus.

All write requests are preferably loaded into the low priority FIFO queue 422, whereas read requests may be loaded into either the low priority FIFO queue 422 or the high priority FIFO queue 424. As for the latter, a read request is always loaded into the high priority queue if there is no request directed to the same address of that read request currently loaded into the low priority queue and there are no read requests in the low priority (LP) FIFO queue 422. If either of these conditions are true, the read request is loaded into the low priority FIFO queue. Preferably, the tags 510 associated with the pending command table entries, rather than the actual requests, are loaded into the FIFO queues 420.

As noted, each intermediate target 320a coupled to the I/O bus 300, including the I/O controller 250, contains queues 330 specified by the bus protocol: the posted request queue 332, the non-posted request queue 334 and the response queue 336. The I/O bus 300 further specifies a flow control mechanism to determine whether the next device 320 coupled to the bus has resources available to receive posted or non-posted requests from the controller 250. The flow control mechanism is invoked when resources within the devices coupled to the I/O bus are unavailable. As a result, the requests loaded into different queues 330 may become out of order.

For example, if the non-posted request queue 334 in the intermediate target 320a configured to store read requests becomes full, a device 320 may invoke flow control to suppress further issuance of those requests to that device. In that case, another request (such as a write request) loaded into the posted request queue 332 may be issued over the bus 300 prior to the pending read request in the non-posted queue 334 to thereby generate an out-of-order condition on the bus. This condition, which results in a write request "passing" a read request, typically arises to avoid deadlock on the I/O bus 300 and to enhance system throughput.

Assume that in the low priority queue 422, there are no pending requests to address A and no pending read requests to any other address. Further assume a read request directed to address A is issued by the processor 210 to the I/O controller 250 prior to a write request to the same address. Because there is no request to address A pending in the low priority queue 422 and there are no pending read requests to any other address currently in the low priority queue 422, the controller 250 loads the read request into the high priority queue 424 and then loads the subsequent write request into the low priority queue 422. The controller typically services the high priority queue 424 before servicing the low priority queue 422, if it is able to do so. The ability of the controller 250 to service its priority queues 420 is dependent on the status of the posted and non-posted request queues at the interface to the I/O bus 300.

Yet, even if the high priority (read) request is serviced before any low priority request, the I/O controller 250 cannot guarantee that a target 320 "downstream" on the I/O bus 300 will maintain that order. This is because the I/O bus ordering rules allow write requests (e.g., posted requests) to "pass" any other request (e.g., non-posted requests) thereby reordering transactions at a device (such as a repeater) on the bus to avoid deadlock. For example, if the non-posted request queue 334 of an adjacent downstream repeater is full, that repeater 320a invokes the flow control mechanism to prevent the I/O controller from sending the pending read request at the head of its non-posted request queue 334 over the bus 300. Similarly, another downstream device on the I/O bus may invoke flow control to prevent an adjacent upstream device from sending it a non-posted request. Invocation of flow control may lead to a subsequent write request passing the read request and, therefore, an ordering problem.

Prior solutions to the ordering problem require that the source, such as processor 210, wait until issuing a subsequent request if it needs to maintain ordering. In other words, since write requests can pass read requests, the processor must "hold off" issuing a subsequent write request until the response to a previous read request completes to thereby ensure ordering among those requests. Typically, software (e.g., a device driver) executing on the processor issues a read request and then waits until the response to that request completes before issuing a subsequent request. This results in a substantial performance penalty since the processor is essentially waiting (stalling) and not performing any useful function during this period of time.

The present invention is generally directed to an apparatus for off-loading responsibility for maintaining order among requests from the processor to the I/O controller, thereby increasing the performance of the processor. More specifically, the present invention is directed to a technique that enables the I/O controller to "hold off" a subsequent (write) request directed to an address until all pending (read) requests complete. By off-loading responsibility for maintaining order among requests from the processor to the controller, the invention enhances performance of the processor since the processor may proceed with program execution without having to ensure ordering. The ordering circuit 400 described herein maintains the order of the requests in an efficient manner that is transparent to the processor.

Figure 6:
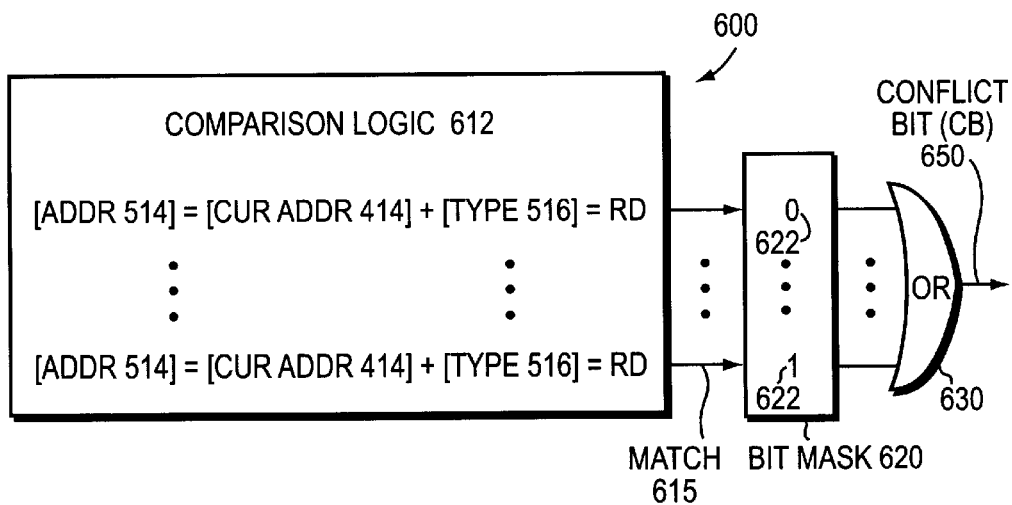
FIG. 6 is a functional block diagram of conflict detection logic in accordance with the present invention.

To that end, the circuit 400 further comprises conflict detection logic 600, a functional block diagram of which is shown in FIG. 6. The logic 600 comprises conventional circuitry configured to compare the address of a current write request (Cur Addr 414) received from processor 210 with the address of all pending read requests to determine if any of the addresses are the same. That is, prior to loading the current write request into, e.g., the low priority FIFO 422 of the controller 250, the address of that request is compared with the addresses of all pending read requests listed in the pending command table 500 to determine whether there is a match. If the address of the current write request matches an address of any pending read request, then a conflict bit 650 associated with the current request is asserted and loaded into the low priority FIFO 422 along with the request. According to the invention, assertion of the conflict bit 650 denotes that there is a pending read request directed to the same address as the current write request.

Illustratively, conventional comparison logic 612 includes discrete comparator logic, each associated with an entry 512 of the pending command table 500 and configured to compare the address 514 of the request stored in the entry with the current address 414 to determine whether they are the same. In addition, logic 612 determines whether the type 516 of command pending in the entry 512 is a read (RD) request. Accordingly, a match 615 arises if the compared addresses are the same and the type of command associated with the pending entry is a read request. If the command loaded in the entry is not a pending read request, a match condition does not arise.

In response to the comparison operations, the conflict detection logic 600 generates a bit-mask 620 having a plurality of bits 622 that indicates those entries of the pending command table whose address match the address of the current write request. The resulting (e.g., 16-bit) value 620 is then logically combined using, e.g., a Boolean OR gate 630, such that if at least one matching bit is asserted, a conflict bit 650 is generated and asserted and forwarded to the input queue manager 450. The asserted conflict bit (CB) 650 is loaded into the low priority FIFO 422 together with the tag 510 associated with the current write request. The current write request eventually makes its way up to the head of the low priority queue 422 and a decision is rendered as to whether to send that request to the posted/non-posted request queues 330 at the interface to the I/O bus 300. Typically, requests in the high priority queue are serviced first; however, that queue may be empty or the flow control mechanism may be invoked to suppress issuance of any requests from that queue. Thus, even though the current write request is the next request to be serviced in the low priority queue, a determination is made whether to send that request over the I/O bus. To that end, the present invention provides a (logical) read-in-progress register 440 to assist in this determination.

The read-in-progress register 440 is used to ensure ordering over the I/O bus 300. The read-in-progress register 440 is essentially a bit map having a plurality of bits, wherein each bit 442 of the register 440 corresponds to a pending read request sent over the I/O bus 300 and stored in an entry 512 of the pending command table 500. Each bit 442 of the read-in-progress register 440 denotes some state of the pending read requests; however, this state is different than the state 518 of the read request stored in the pending command table 500. Specifically, each asserted bit of the read-in-progress register 440 identifies a read request that could be passed by the current (e.g., write) request. In the preferred embodiment of the invention, each bit in the read-in-progress register 440 corresponds to an entry 512 in the pending command table 500.

The pending state 518 in the pending command table 500 denotes that the associated read request has been received from a processor 210 over the system bus 202 and that the response data has yet to be received and made available for the processor. In contrast, the assertion of a particular bit 442 in the read-in-progress register 440 denotes that the request could be passed by the current write request over the I/O bus 300. An example of the difference between the two states is when a subsequent read request to the same address is loaded into the low priority FIFO 422 behind the current write request. Here, the subsequent read request cannot be passed by the write request and, accordingly, its corresponding bit 442 in the read-in-progress register 440 is not asserted.

In the illustrative embodiment, there are two (2) cases of read requests that are analyzed to determine whether bits should be set in the read-in-progress register. In a first case, a subsequent read request is loaded into the low priority FIFO 422 behind a write request. Although the pending state 518 is asserted in the pending command table 500 for the subsequent read request, the corresponding bit 442 in the read-in-progress register 440 is not asserted. That is, even though the subsequent read request is directed to the same address as the current write address, the fact that the subsequent read request is loaded behind the current write request in the same FIFO queue means that the read request cannot be passed by the write request.

A second case involves the loading of a read request not directed to the same address as the write request into the high priority FIFO 424. Here, as the read request is loaded into the high priority FIFO, the corresponding bit 442 in the read-in-progress register 440 is asserted for that request. The bit is asserted in the read-in-progress register because a write request loaded in the low priority FIFO could potentially be serviced before the pending read request in the high priority FIFO. Preferably, an input queue manager 450 asserts (sets) a bit 442 in the read-in-progress register 440 as its corresponding read request is loaded into the high priority FIFO 424.

The input queue manager 450 is illustratively configured to receive requests from the system bus 202, allocate an entry 512 of the pending command table 500 for each received request and update that entry with appropriate information. The input queue manager 450 also loads the request onto the appropriate high priority or low priority FIFO queue 420 and sets the corresponding bit 442 of the read-in-progress register 440. In the preferred embodiment, the input queue manager 450 loads the tag 510 associated with the entry 512 of the pending command table 500 into the appropriate FIFO queue 420 rather than the entire request.

On the other hand, the conflict detection logic 600 is configured to examine the entry contents of the pending command table 500. As a result of the logical comparison operations, the logic circuitry 600 generates the conflict bit 650 (when appropriate) and forwards that bit to the input queue manager 450. Notably, the conflict bit 650 is only asserted for write requests directed to the same address as a pending read request. The input queue manager 450 loads the conflict bit 650 into the low priority FIFO queue 422 for write request.

The ordering circuit 400 further includes an output queue manager 460 that determines from which priority FIFO queue 420 it will service (retrieve) pending requests for loading into the posted and non-posted request queues 330 at the interface to the I/O bus 300. The output queue manager 460 generally services the high priority FIFO 424 first (if possible) when loading the read requests into the non-posted request queue 334 of the I/O bus interface. The output queue manager may also, when appropriate, move a pending write request into the posted request queue 332 of the interface while substantially simultaneously moving a pending read request into the non-posted request queue 334. In the case of a posted write, the output queue manager 460 further marks the corresponding entry 512 in the pending command table 500 as non-pending since no response is expected. In addition, the output queue manager sets bits 442 in the read-in-progress register 440 when a read request arrives at the head of the low priority FIFO 422.

If two read requests directed to the same address arrive at the heads of the low and high priority queues 420 simultaneously, the output queue manager 460 services the request in the high priority queue 424 first. Therefore, the conflict bit 650 is not needed for the read request in the low priority queue 422. However, when the output queue manager retrieves the read request from the low priority queue 422 and forwards that request to the I/O bus interface, it sets the corresponding bit 442 in the read-in-progress register 440 because at this time, the read request is truly "in progress". In this context, "in progress" denotes that the read request may be potentially "passed" by a write request. In other words, the asserted bit 442 in the read-in-progress register denotes that, because of the ordering rules of the I/O bus 300, a read request that is "in progress" and directed to a particular address location may be potentially passed by a write request that was queued subsequent to the read request and is also directed to the same address. That is, assertion of a bit in the read-in-progress register denotes a read request that the current write request could pass.

The ordering circuit 400 further includes a response manager 470 that, in accordance with the invention, clears the bits 442 in the read-in-progress register 440 when the corresponding read requests are no longer in progress. The read requests are no longer in progress when their responses are returned to the I/O controller 250.

The response manager 470 uses the tag 510 contained in the response packet to identify the corresponding bit 442 in the read-in-progress register 440 to clear when the response is received. The response manager also uses the tag 510 to retrieve the entry 512 from the pending command table 500 and extract the source ID field 519. The source ID field is used to identify the source of the request and forward the response data over the system bus 202 to that source.

It should be noted that the input queue manager 450, the output queue manager 460 and response manager 470 comprise conventional logic circuitry used to allocate and update entries of the data structures described herein, as well as buffers and transceiver circuitry to receive and output values for those entries. In the illustrative embodiment, these managers may be implemented in hardware, although it should be understood that the methods pertaining to the present invention may alternatively be implemented through software techniques and structures.

In accordance with the present invention, the conflict bit 650 and the read-in-progress register 440 cooperate to determine when to send a current write request from the low priority FIFO 422 to the I/O bus interface so as to avoid an out-of-order transaction processing issue that may result in the processing of inconsistent data. Specifically, if the conflict bit 650 associated with the current write request is asserted and any bit 442 in the read-in-progress register 440 is non-zero (i.e., asserted), then the current write operation is not sent to an I/O bus interface queue 330. Assertion of the conflict bit denotes that there may be a transaction ahead of the current request that may conflict with that request. By waiting to send the current write request until all bits 442 in the read-in-progress register 440 are cleared (therefore denoting that there is no potential conflict with a pending request) the present invention ensures that there is no conflicting transaction directed to the address of the current request. Thus, the assertion of any bit 442 in the read-in-progress register 440 denotes the possibility of the current write request passing a pending read request directed to the same address as the current write request. In that case, the current write request is "held off" until the conflicting read request completes.

It should be noted that when new read requests directed to different addresses than the address of a current write request are loaded onto the high priority FIFO 424, their associated bits 442 in the read-in-progress 440 are not asserted.

Advantageously, the ordering circuit 400 provides a hardware solution that off-loads the requirement of processor 210 to maintain order among conflicting requests issued to I/O devices coupled to an I/O bus 300. Therefore, the processor 210 may issue a pre-fetch read request to an address and forward that request to the I/O controller 250. The processor 210 may then issue a write request to that address and not have to endure any latency (i.e., the processor may continue processing other information) since the I/O controller 250 maintains responsibility for ordering of those requests.

While there has been shown and described an illustrative embodiment for off-loading responsibility for maintaining order among requests issued over a split transaction I/O bus from a processor to an I/O controller, it is to be understood that various other adaptations and modifications may be made within the spirit and scope of the invention. For example, in an alternate embodiment, a content addressable memory (CAM) may be used instead of discrete comparators of logic 612 within conflict detection logic 600. The CAM may be used because the conflict bit 650 is asserted as long as one of the entries 512 has an address 514 that matches the current address 414. In this context, the "hit" bit of a conventional CAM data structure essentially functions as the conflict bit 650.

In another alternate embodiment, only a single priority queue 420 (as opposed to two priority queues 422, 424) may be used with the present invention. Since there is only one queue, bits 442 are not set in the read-in-progress register 440 as a result of subsequent read requests being potentially serviced before a pending write request. In other words, the subsequent requests are loaded onto the FIFO queue behind the current write request and, thus, there is no need for the input queue manager to assert any additional bits 442 in the read-in-progress register. Although the single queue implementation obviates the possibility of additional conflicting read requests "getting ahead" of a current request, this implementation is not considered a high-performance solution since the output queue manager 460 can only service one request at a time. The output queue manager 460 may still maintain and manipulate the contents of the read-in-progress register 440, particularly when read requests have been sent over the I/O bus 300, i.e., have been loaded into the appropriate queues at the interface of the bus.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An ordering circuit configured to off-load responsibility for maintaining order among requests issued over a split transaction bus from a processor to a split transaction bus controller of an intermediate network node, the ordering circuit comprising:

a command table having a plurality of entries, each entry adapted to track a pending read request issued by the processor and destined for the split transaction bus;

conflict detection logic coupled to the command table, the conflict detection logic comparing an address of a write request issued by the processor with an address of a pending read request stored in each entry of the command table, the conflict detection logic asserting a conflict bit corresponding to an entry of the command table when the address of any pending read request stored in the entry matches the address of write request; and a read-in-progress register having a plurality of bits, each bit corresponding to a pending read request sent over the bus, wherein assertion of a bit of the read-in-progress register and the conflict bit causes the write request to wait until all pending read requests complete before being sent over the split transaction bus to thereby maintain order among read and write requests directed to the same address on the bus.

2. The ordering circuit of claim 1 wherein each entry of the command table comprises:

an address field for storing the address of the request;

a type field for storing a particular type of request; and a state field for storing a state of the request.

3. The ordering circuit of claim 2 wherein each entry of the command table further comprises:

a source ID field for storing the identity of the source of the request.

4. The ordering circuit of claim 1 further comprising:

an input queue manager coupled between a system bus and the command table, the input queue manager receiving a request from the system bus and, in response, allocating an entry in the command table, the input queue manager further calculating a tag value associated with the allocated entry, and placing the type of request and address of the request in the allocated entry.

5. The ordering circuit of claim 4 wherein the input queue manager is further coupled to the conflict detection logic and a low priority FIFO, the input queue manager sending the address of the request to the conflict detection logic and, in response, receiving a match bit map from the conflict detection logic, the input queue manager loading the received match bit map and the tag value into an entry in the low priority FIFO.

6. The ordering circuit of claim 5 further comprising:

a response manager coupled to the low priority FIFO and a response queue, the response manager receiving a response associated with the pending read request from the response queue and deasserting an asserted match bit corresponding to the pending read request for each entry in the low priority FIFO.

7. The ordering circuit of claim 4 wherein the input queue manager is further coupled to the read-in-progress register, the input queue manager receiving a read request from the system bus and asserting a bit in the read-in-progress register that corresponds to the read request.

8. The ordering circuit of claim 1 wherein the conflict detection logic comprises:

comparator logic associated with each entry of the command table and configured to compare the address of the request stored in the command table entry with the address associated with the request.

9. The ordering circuit of claim 8 wherein the match bit is asserted if the compared addresses are the same and the type of command in the entry is a read request.

10. The ordering circuit of claim 1 further comprising:

an output queue manager coupled to a high priority FIFO and the low priority FIFO, the output queue manager servicing a request at the high priority FIFO before servicing a request at the low priority FIFO.

11. The ordering circuit of claim 10 wherein the output queue manager is further coupled to a read-in-progress register, the output queue manager receiving a read request from one of the high priority FIFO or the low priority FIFO and asserting a bit in the read-in-progress register that corresponds to the read request.

12. The ordering circuit of claim 1 further comprising:

a response manager coupled to the pending command table, the response manager receiving a response associated with the pending request and changing a state field in the command table entry associated with the pending request to indicate the entry is non-pending.

13. The ordering circuit of claim 1 further comprising:

a response manager coupled to the read-in-progress register, the response manager receiving a response associated with the pending request and deasserting a bit corresponding to the pending request in the read-in-progress register.

14. A method for maintaining order among read and write requests directed to a same address on a split transaction bus from a processor to a split transaction bus controller of an intermediate network node, the method comprising the steps of:

receiving a request at an ordering circuit of the controller, the request containing a type of the request and an address of the request;

storing the request into an entry in a command table and marking the request as pending;

if the type of the request is a write request, searching the command table and asserting a match bit for each pending read request entry whose request address stored in the entry matches the address of the write request;

if the request is a write request, loading the request in a low priority output queue;

if the request is a read request, loading the request in a high priority output queue and asserting a corresponding bit in a read-in-progress register unless the low priority queue contains either a read request or another request whose request address is the same as the request in which case the request is loaded into the low priority output queue;

when the request reaches the head of the output queue, determining if any match bit is asserted in any entry associated with the request and if the request is a write request, determining if any bit in the read-in-progress register is asserted;

if any match bit is asserted and if the request is write request any bit in the read-in-progress register is asserted, causing the request to wait at the head of the output queue until all match bits are deasserted and if the request is a write request until all bits in the read-in-progress register are deasserted; and as each pending read request completes, marking the entry for the read request as non-pending, deasserting the match bit associated with the read request for all entries in the table and deasserting the bit associated with the read request in the read-in-progress register.

15. Apparatus for maintaining order among read and write requests directed to a same address on a split transaction bus from a processor to a split transaction bus controller of an intermediate network node, the apparatus comprising:

means for receiving a request at an ordering circuit of the controller, the request containing a type of the request and an address of the request;

means for storing the request into an entry in a command table and marking the request as pending;

if the type of the request is a write request, means for searching the command table and asserting a match bit for each pending read request entry whose request address stored in the entry matches the address of the write request;

if the request is a write request, means for loading the request in a low priority output queue;

if the request is a read request, means for loading the request in a high priority output queue and asserting a corresponding bit in a read-in-progress register unless the low priority queue contains either a read request or another request whose request address is the same as the request in which case the request is loaded into the low priority queue;

when the request reaches a head of the output queue, means for determining if match bit is asserted in any entry associated with the request and if the request is a write request, determining if any bit in the read-in-progress register is asserted;

if any match bit is asserted and if the request is a write request if any bit in the read-in-progress register is asserted, means for stalling the request at the head of the output queue until all match bits are deasserted and if the request is a write request all bits in the read-in-progress register are deasserted; and as each pending read request completes, means for marking the entry for the read request as non-pending, deasserting the match bit associated with the read request for all entries in the table and deasserting the bit associated with the read request in the read-in-progress register.

16. A computer readable medium containing executable program instructions for maintaining order among read and write requests directed to a same address on a split transaction bus from a processor to a split transaction bus controller of an intermediate network node, the executable program instructions comprising program instructions for:

means for receiving a request at an ordering circuit of the controller, the request containing a type of the request and an address of the request;

storing the request into an entry in a command table and marking the request as pending;

if the type of the request is a write request, searching the command table and asserting a match bit for each pending read request entry whose request address stored in the entry matches the address of the write request;

if the request is a write request, loading the request in a low priority output queue;

if the request is a read request, loading the request in a high priority output queue and asserting a corresponding bit in a read-in-progress register unless the low priority queue contains either a read request or another request whose request address is the same as the request in which case the request is loaded into the low priority output queue;

when the request reaches the head of the output queue, determining if any match bit is asserted in any entry associated with the request and if the request is a write request, determining if any bit in the read-in-progress register is asserted;

if any match bit is asserted and if the request is write request any bit in the read-in-progress register is asserted, causing the request to wait at the head of the output queue until all match bits are deasserted and if the request is a write request until all bits in the read-in-progress register are deasserted; and as each pending read request completes, marking the entry for the read request as non-pending, deasserting the match bit associated with the read request for all entries in the table and deasserting the bit associated with the read request in the read-in-progress register.

17. An ordering apparatus for maintaining order among requests issued over a split transaction bus from a processor to a split transaction bus controller, comprising:

a command table having a plurality of entries, each entry adapted to track a pending read request issued by the processor on the split transaction bus; and conflict detection logic coupled to the command table, the conflict detection logic comparing an address of a write request issued by the processor with an address of each pending read request stored in the command table, and in the event that an address of the write request matches an address of a pending read request, causing the write request to wait until all pending read requests complete before the write request is sent over the split transaction bus, to maintain order among read and write requests on the split transaction bus without stalling the processor.

18. The apparatus as in claim 17, further comprising:

a read-in-progress register having a plurality of bits, each bit corresponding to a pending read request;

the conflict detection logic asserting a conflict bit when the address of any pending read request stored in the entry matches the address of the write request, and the write request waiting, in response to assertion of a bit of the read-in-progress register and the conflict bit, until all pending read requests complete before the write request is sent over the split transaction bus.

19. The apparatus of claim 18 further comprising:

a response manager to clear a bit in the read-in-progress register corresponding to a read instruction which is in progress, the bit being cleared in response to receiving a response to the corresponding read instruction.

20. The apparatus of claim 19 further comprising:

an output queue manager to send the pending write request over the split transaction bus in response to all bits in the read-in-progress register being cleared.

21. The apparatus of claim 17 further comprising:

a high priority queue and a low priority queue;

an input queue manager to place the write request into the low priority queue;

the input queue manager, in response to receiving a subsequent read request for an address matching an address of the pending write request, to write the subsequent read request into the low priority queue after the write request and to not set the bit corresponding to the subsequent read request in the read-inprogress register, because the subsequent read request cannot pass the pending write request and so cannot be executed before the pending write request;

the input queue manager, in response to receiving a different subsequent read request directed to an address different from the address of the pending write request, loading the different subsequent read request into the high priority queue and also setting the bit in the read-in-progress register corresponding to the different subsequent read request to cause the pending write request to wait for receipt of the response to the different subsequent write request.

22. The apparatus of claim 21, further comprising:

an output queue manager receiving a read request from the low priority queue and transmitting the read request over the split transaction bus, and also asserting a bit in the read-in-progress register that corresponds to the read request.

23. The apparatus of claim 17, further comprising:

a high priority queue and a low priority queue;

an input queue manager receiving a read request from the processor; and the input queue manager coupled to the conflict detection logic and a low priority queue, the input queue manager sending the address of the request to the conflict detection logic, and in response to receiving a conflict bit from the conflict detection logic, loading the received conflict bit and a tag value identifying the read request into an entry in the low priority queue.

24. The apparatus of claim 23 further comprising:

the input queue manager is further coupled to the read-in-progress register and the high priority queue, the input queue manager receiving a read request from the processor and asserting a bit in the read-in-progress register that corresponds to the read request when the request is placed in the high priority queue.

25. The apparatus of claim 17 further comprising:

a response manager coupled to the read-in-progress register, the response manager receiving a response to a pending read request; and the response manager, in response to receiving the response to a pending read request, deasserting a bit in the read-in-progress register corresponding to the pending read request.

26. The apparatus of claim 17, further comprising:

comparison logic to compare an address of a pending read request with the address of the write request;

the comparison logic, in response to the address of the write request matching the address of any pending read request, asserting a bit in a bit mask; and an OR circuit, in response to any bit in the bit mask being asserted, asserting a conflict bit.

27. The apparatus of claim 17 further comprising:

a high priority queue and a low priority queue;

an output queue manager coupled to the high priority queue and the low priority queue, the output queue manager servicing a request at the high priority queue before servicing a request at the low priority queue.

28. A method for maintaining order among requests issued over a split transaction bus from a processor to a split transaction bus controller, comprising:

tracking a pending read request issued by the processor on the split transaction bus; and comparing an address of a write request issued by the processor with an address of each pending read request, and in the event that an address of the write request matches an address of a pending read request, causing the write request to wait until all pending read requests complete before the write request is sent over the split transaction bus, to maintain order among read and write requests on the split transaction bus without stalling the processor.

29. The method as in claim 28, further comprising:

maintaining a read-in-progress register having a plurality of bits, each bit corresponding to a pending read request; and asserting a conflict bit when the address of any pending read request matches the address of the write request, and the write request waiting, in response to assertion of a bit of the read-in-progress register and the conflict bit, until all pending read requests complete before the write request is sent over the split transaction bus.

30. The method of claim 29 further comprising:

clearing a bit in the read-in-progress register corresponding to a read instruction which is in progress, the bit being cleared in response to receiving a response to the corresponding read instruction.

31. The method of claim 30 further comprising:

sending the pending write request over the split transaction bus in response to all bits in the read-in-progress register being cleared.

32. The method of claim 28 further comprising:

maintaining a high priority queue and a low priority queue;

placing the write request into the low priority queue;

writing, in response to receiving a subsequent read request for an address matching an address of the pending write request, the subsequent read request into the low priority queue after the write request and not setting the bit corresponding to the subsequent read request in the read-in-progress register, because the subsequent read request cannot pass the pending write request and so cannot be executed before the pending write request; and loading, in response to receiving a different subsequent read request directed to an address different from the address of the pending write request, the different subsequent read request into the high priority queue and also setting a bit in the read-in-progress register corresponding to the different subsequent read request to cause the pending write request to wait for receipt of the response to the different subsequent write request.

33. The method of claim 32, further comprising:

receiving a read request from the low priority queue and transmitting the read request over the split transaction bus, and also asserting a bit in the read-in-progress register that corresponds to the read request.

34. The method of claim 28, further comprising:

maintaining a high priority queue and a low priority queue;

receiving a read request from the processor, and in response allocating an entry in the command table; and loading, in response to receiving a conflict bit from the conflict detection logic, the received conflict bit and a tag value identifying the read request into an entry in the low priority queue.

35. The method of claim 34 further comprising:

receiving a read request from the processor, placing the read request in the high priority queue, and asserting a bit in the read-in-progress register that corresponds to the read request.

36. The method of claim 28 further comprising:

receiving a response to a pending read request; and deasserting, in response to receiving the response to a pending read request, a bit in the read-in-progress register corresponding to the pending read request.

37. The method of claim 28, further comprising:

comparing an address of a pending read request with the address of the write request;

asserting, in response to the address of the write request matching the address of any pending read request, a bit in a bit mask; and asserting, in response to any bit in the bit mask being asserted, a conflict bit.

38. The method of claim 28 further comprising:

maintaining a high priority queue and a low priority queue;

servicing a request at the high priority queue before servicing a request at the low priority queue.

39. An apparatus to maintain order among requests issued over a split transaction bus from a processor to a split transaction bus controller, comprising:

means for tracking a pending read request issued by the processor on the split transaction bus; and means for comparing an address of a write request issued by the processor with an address of each pending read request, and in the event that an address of the write request matches an address of a pending read request, causing the write request to wait until all pending read requests complete before the write request is sent over the split transaction bus, to maintain order among read and write requests on the split transaction bus without stalling the processor.

40. The apparatus as in claim 39, further comprising:

a read-in-progress register having a plurality of bits, each bit corresponding to a pending read request; and means for asserting a conflict bit when the address of any pending read request matches the address of the write request, and the write request waiting, in response to assertion of a bit of the read-in-progress register and the conflict bit, until all pending read requests complete before the write request is sent over the split transaction bus.

41. The apparatus of claim 40 further comprising:

means for clearing a bit in the read-in-progress register corresponding to a read instruction which is in progress, the bit being cleared in response to receiving a response to the corresponding read instruction.

42. The apparatus of claim 41 further comprising:

means for sending the pending write request over the split transaction bus in response to all bits in the read-in-progress register being cleared.

43. The apparatus of claim 39 further comprising:

means for maintaining a high priority queue and a low priority queue;

means for placing the write request into the low priority queue;

means for writing, in response to receiving a subsequent read request for an address matching an address of the pending write request, the subsequent read request into the low priority queue after the write request and not setting the bit corresponding to the subsequent read request in the read-in-progress register, because the subsequent read request cannot pass the pending write request and so cannot be executed before the pending write request; and means for loading, in response to receiving a different subsequent read request directed to an address different from the address of the pending write request, the different subsequent read request into the high priority queue and also setting a bit in the read-in-progress register corresponding to the different subsequent read request to cause the pending write request to wait for receipt of the response to the different subsequent write request.

44. The apparatus of claim 43, further comprising:

means for receiving a read request from the low priority queue and transmitting the read request over the split transaction bus, and also asserting a bit in the read-in-progress register that corresponds to the read request.

45. The apparatus of claim 39, further comprising:

means for maintaining a high priority queue and a low priority queue;

means for receiving a read request from the processor; and means for loading, in response to receiving a conflict bit from the conflict detection logic, the received conflict bit and a tag value identifying the read request into an entry in the low priority queue.

46. The apparatus of claim 45 further comprising:

means for receiving a read request from the processor, placing the read request in the high priority queue, and asserting a bit in the read-in-progress register that corresponds to the read request.

47. The apparatus of claim 46 further comprising:

means for receiving a response to a pending read request; and means for deasserting, in response to receiving the response to a pending read request, a bit in the read-in-progress register corresponding to the pending read request.

48. The apparatus of claim 47, further comprising:

means for comparing an address of a pending read request with the address of the write request;

means for asserting, in response to the address of the write request matching the address of any pending read request, a bit in a bit mask; and means for asserting, in response to any bit in the bit mask being asserted, a conflict bit.

49. The apparatus of claim 39 further comprising:

means for maintaining a high priority queue and a low priority queue;

means for servicing a request at the high priority queue before servicing a request at the low priority queue.

50. A computer readable media, comprising:

said computer readable media having instructions written thereon for execution on a processor for the practice of the method of claim 14 or claim 28.

51. Electromagnetic signals propagating on a computer network, comprising:

said electromagnetic signals carrying instructions for execution on a processor for the practice of the method of claim 14 or claim 28.

* * * * *